July 20, 1954   H. J. COOPER   2,684,084
APPLICATION OF WEFT TO WARP
Filed Oct. 11, 1950   9 Sheets-Sheet 1

Inventor
Henry James Cooper
By
Ferdinand Broster Bosshardt
Attorney

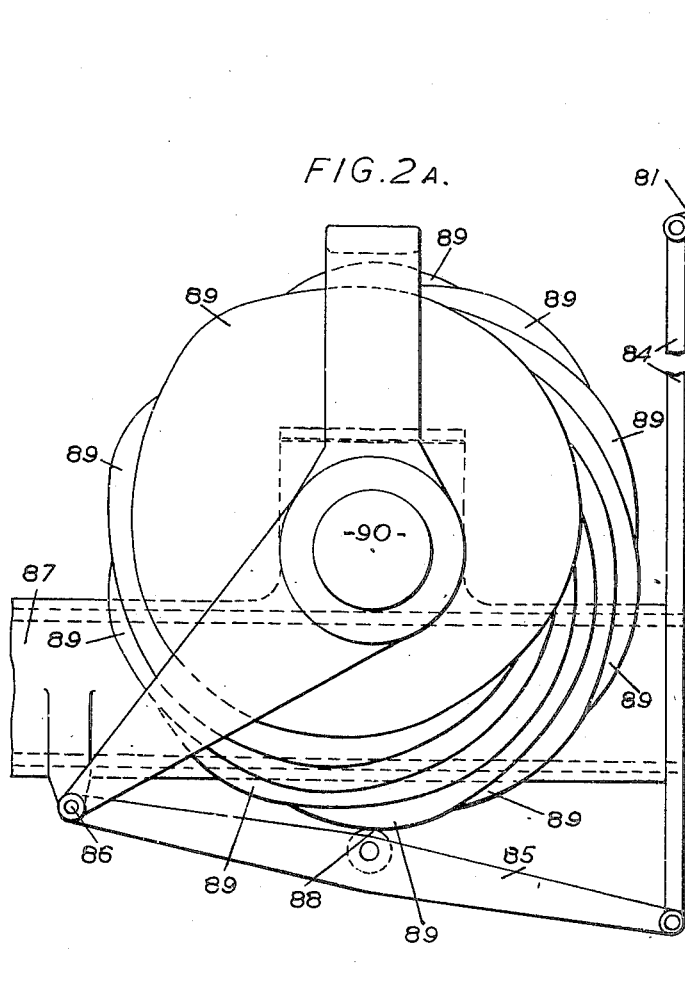

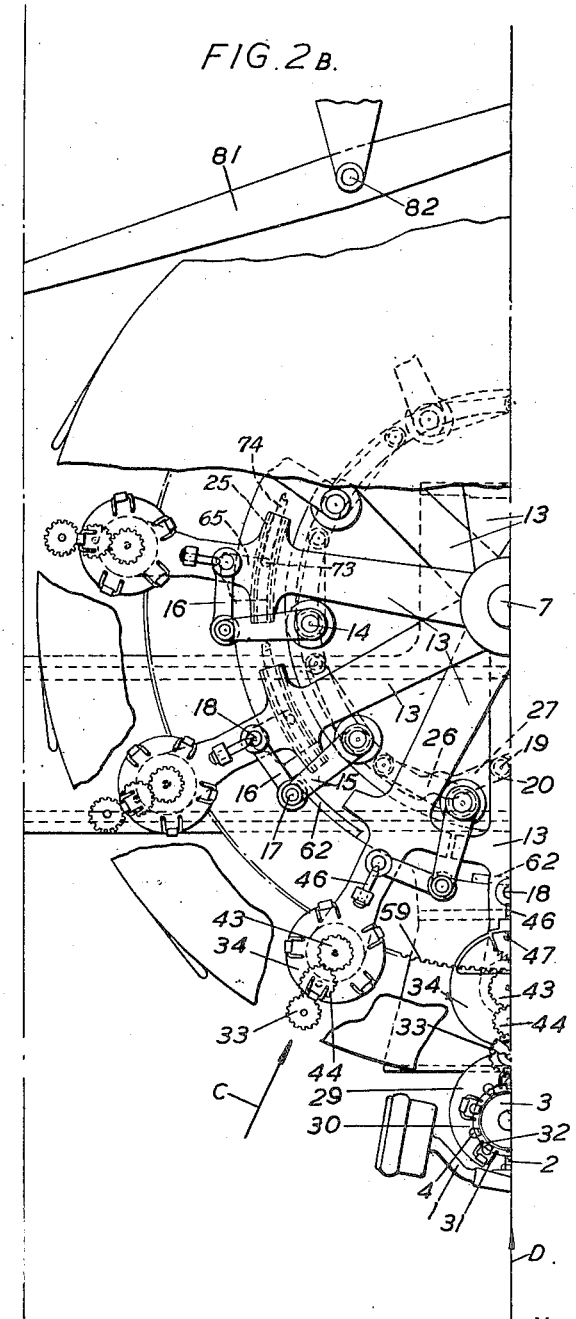

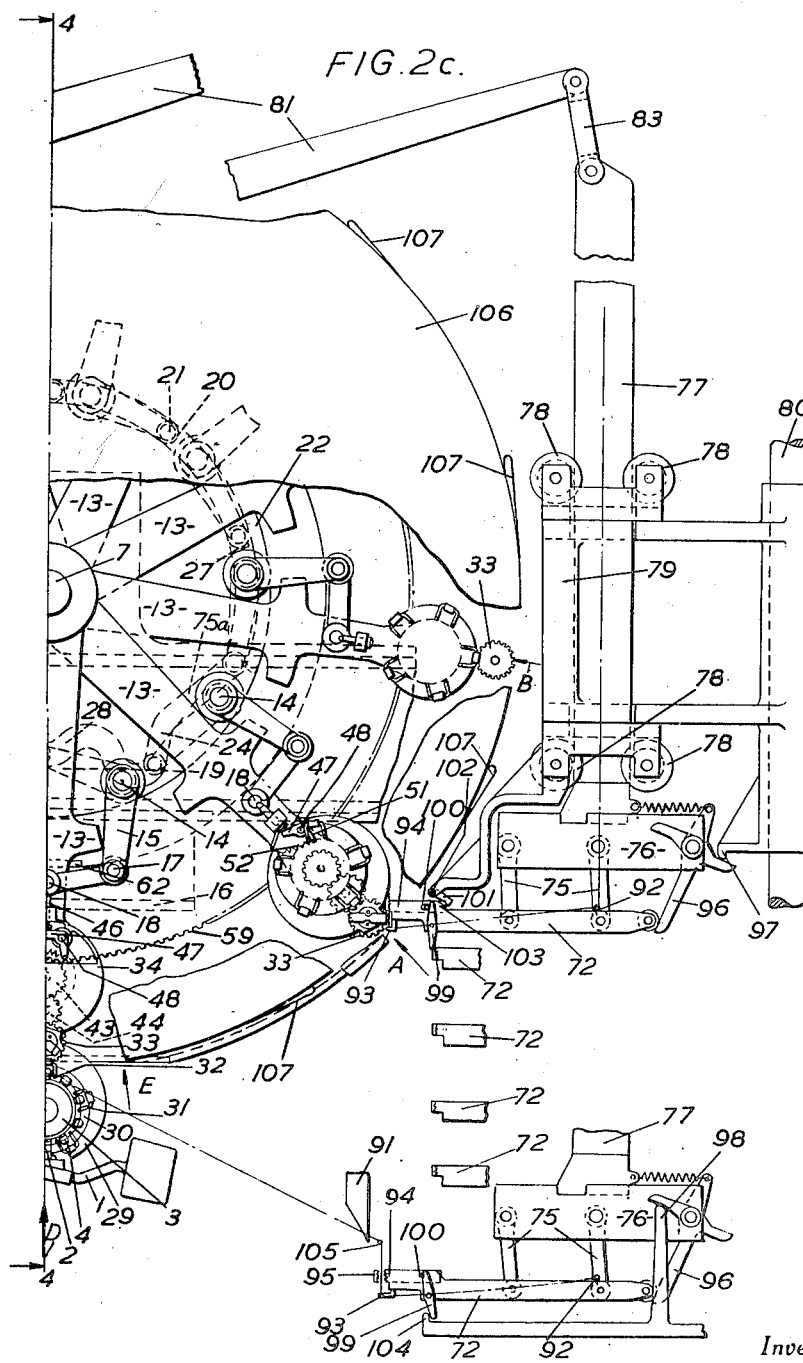

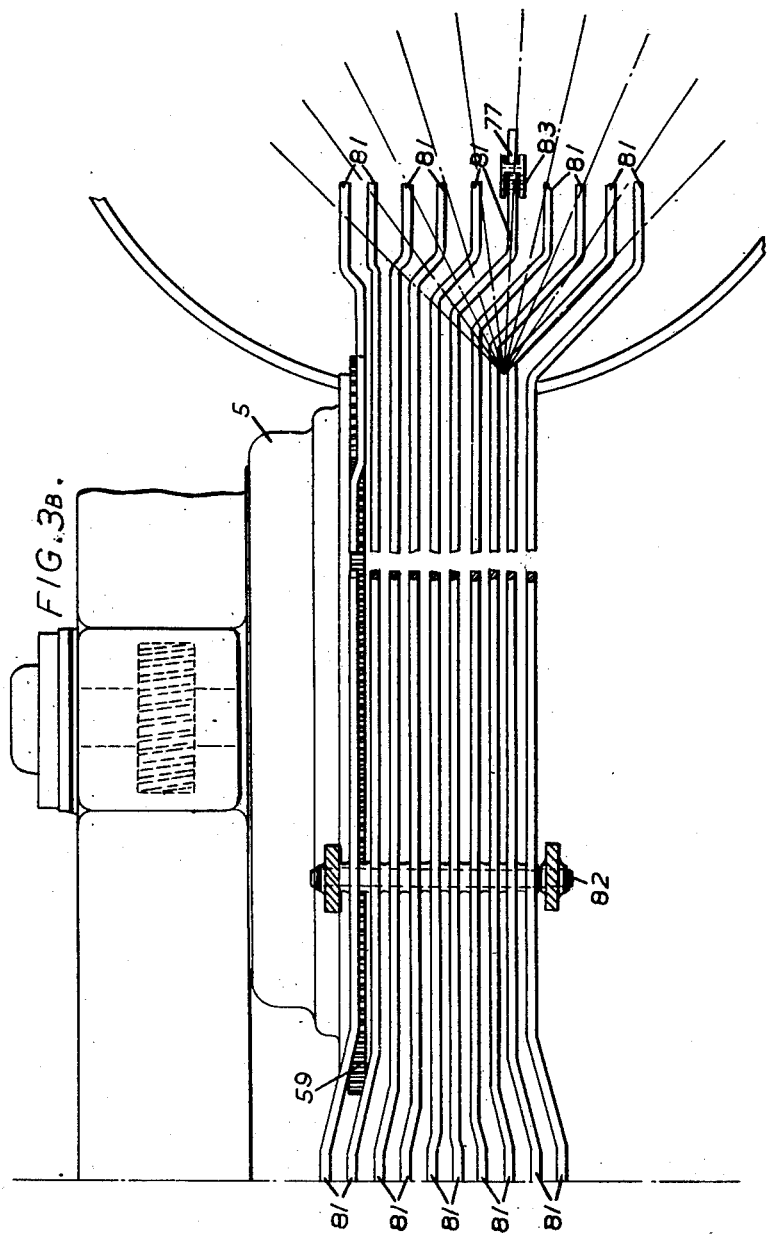

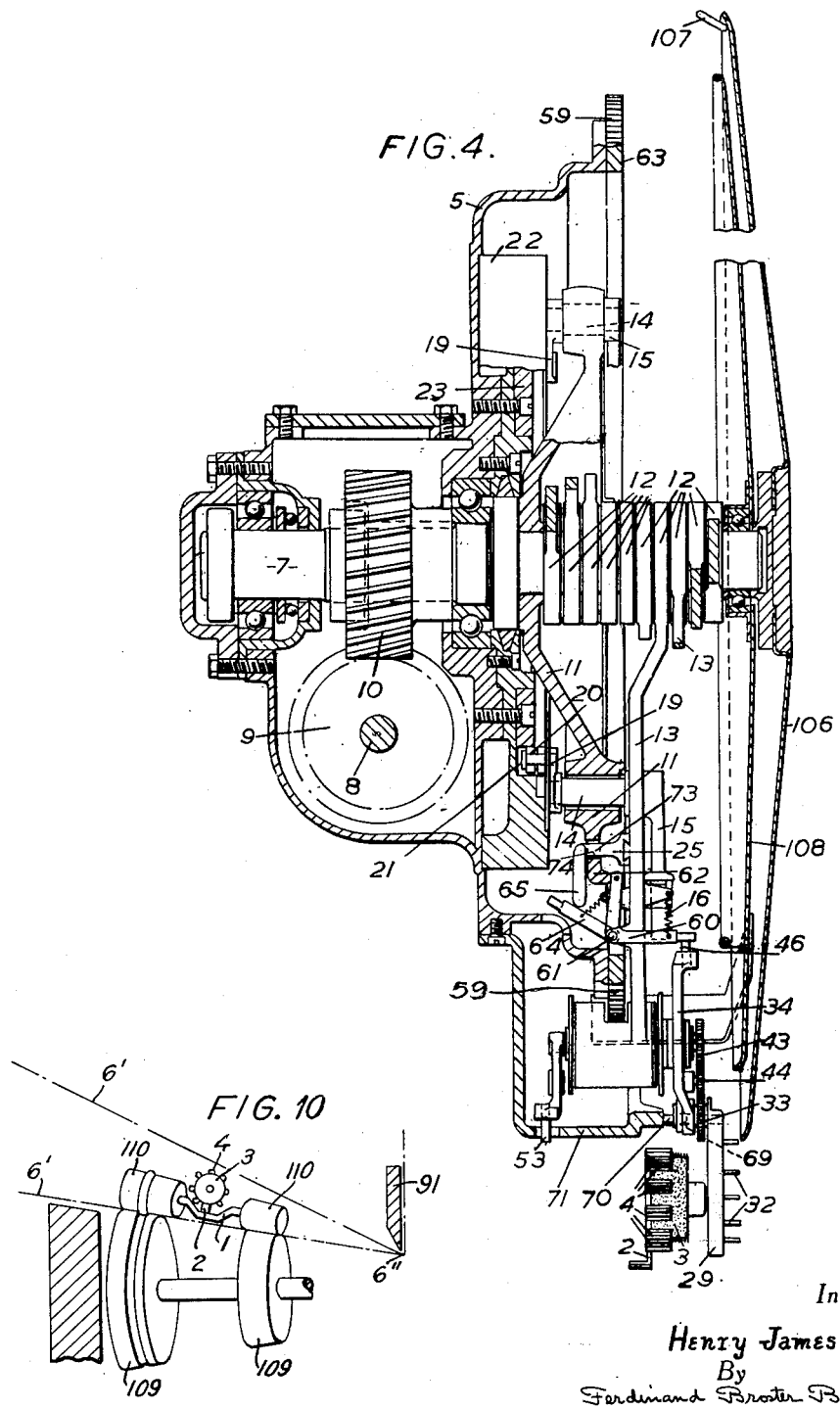

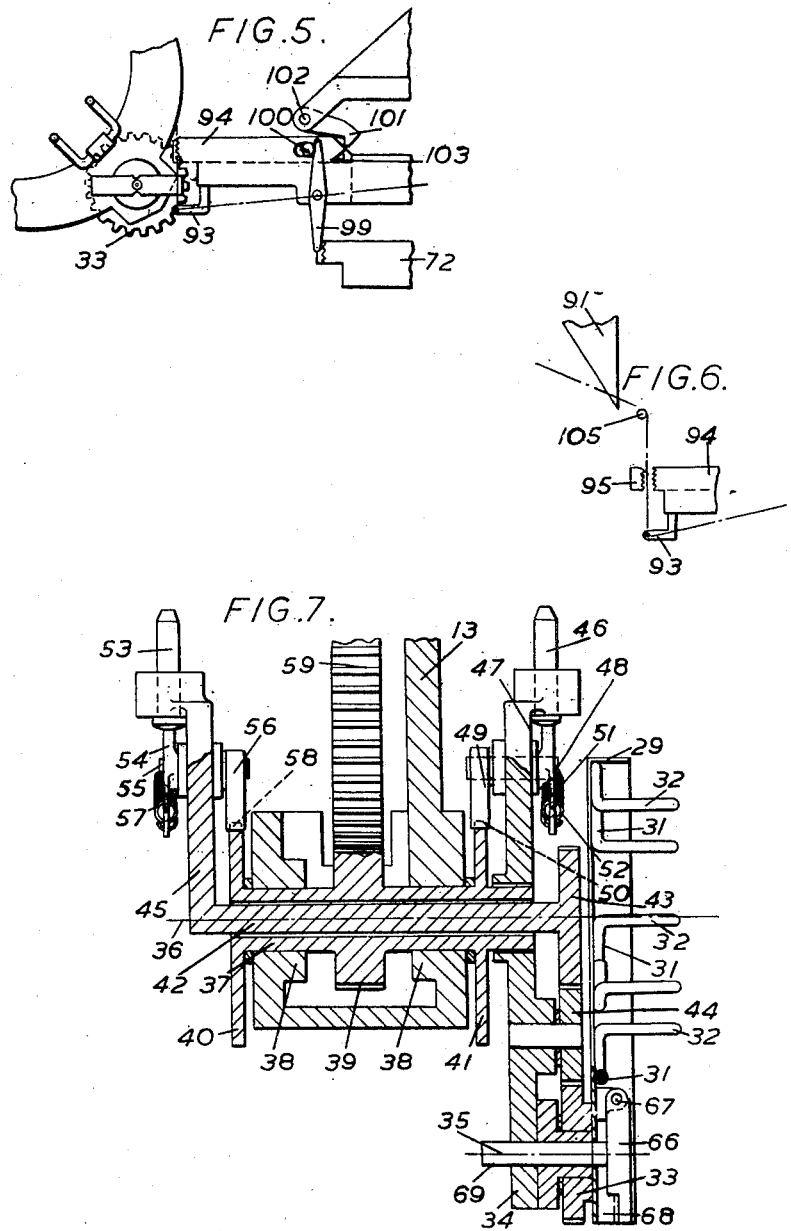

July 20, 1954     H. J. COOPER     2,684,084
APPLICATION OF WEFT TO WARP
Filed Oct. 11, 1950     9 Sheets-Sheet 9
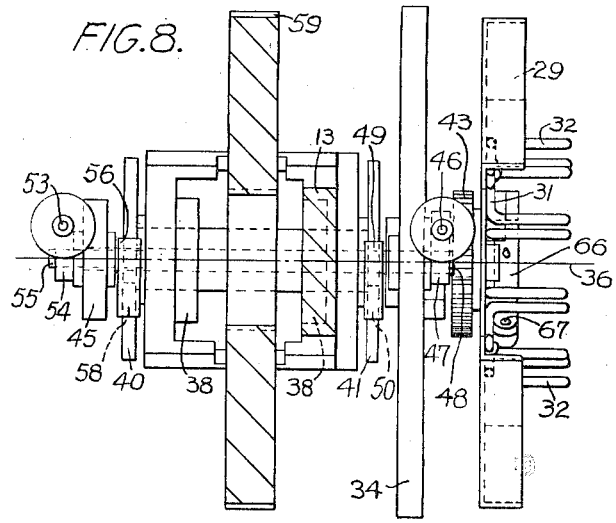
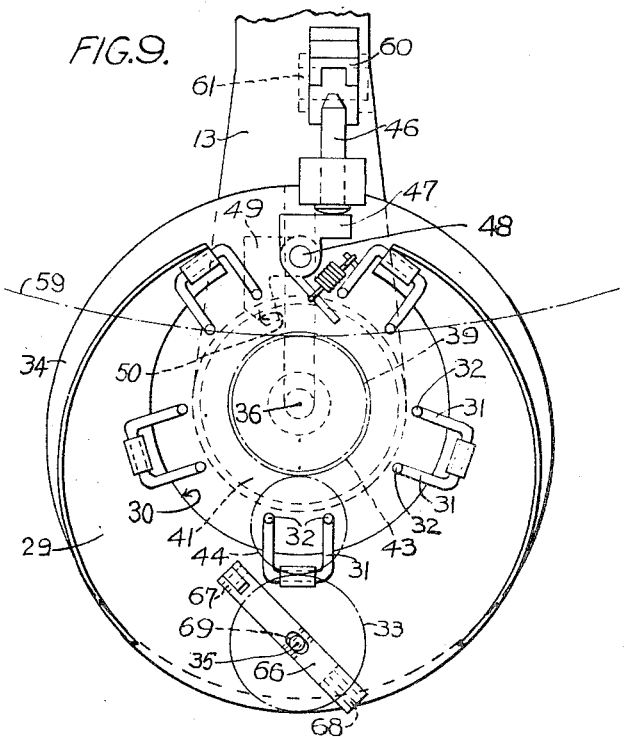
Inventor
Henry James Cooper
By
Ferdinand Broster Bosshardt
Attorney Patented July 20, 1954

2,684,084

UNITED STATES PATENT OFFICE 2,684,084

APPLICATION OF WEFT TO WARP

Henry J. Cooper, Stockport, England

Application October 11, 1950, Serial No. 189,600

13 Claims. (Cl. 139—224)

This invention relates to the application of weft to warps and is applicable in particular to the application of weft to warps in a loom for weaving wherein shuttles travel circularly in a unidirection through a radial warp having a radial gap.

The application of weft to a warp in accordance with the said invention consists in coiling weft into coils and transferring the coils to the shuttles whilst they are travelling across the radial gap, the transferred weft being uncoiled in the warp as the shuttles travel through the warp.

The weft is preferably coiled into coils on bare holders which are conveyed successively into and held temporarily stationary in the path of the shuttles for the transfer of the pre-wound coils from the said holders to the shuttles without uncoiling and without the transference of any weft holder, there being a plurality of holders carrying coiled weft ready for transference to the shuttles, and the coiling of fresh coils of weft on to the holders occurring whilst the loom is in operation.

The weft is preferably coiled into charges, there being a charge for each shuttle and each charge having its tail end in a non-coiled state and held back until the shuttle carrying the charge has uncoiled at least some of the charge inside the warp.

By this process of applying weft to a warp, it is achieved that the weight of the shuttle and its load of weft can be kept light and remains substantially constant, which contributes towards an easy and regular driving of the shuttles, that at no time is it necessary to transfer a heavy or bulky supply of weft to a shuttle or to coil weft on a shuttle, which contributes towards the possibility of an easy, quick and certain transference of weft yarn to the shuttles, and that at no time does a shuttle carry a bulky supply of weft necessitating a wide shedding of the warp for its passage therethrough. A wide shedding of the warp results in more warp thread breakages and necessitates a more slowly moving shedding mechanism consuming more power than does a narrow shedding and therefore, reduces the quality of the fabric and the output of the loom and increases wear of the shedding mechanism. The replenishment of the shuttle in instantaneous, the coiling of the weft being effected before the replenishment, and therefore a warp whose width is controlled by only a narrow radial gap can be used.

Because the transference of the weft yarn to the shuttle takes place without the transference of a holder carrying or supporting the weft yarn, no delay or mechanical provision for removal of such carrying or supporting holders from the shuttles is necessary.

The transference of weft preferably occurs by causing the travelling shuttles to receive the performed coils of weft from holders which are stationary.

The said invention also consists in an apparatus for use in performing the said process.

An apparatus for performing the process in accordance with the said invention has travelling weft holders each adapted to be rotated about its own axis sufficiently to coil a predetermined length of weft on to it and to dwell at a transfer station and have the coils of weft pushed off it on to a shuttle adapted to carry the coils into the warp.

The said holders may be arranged to travel by providing them on arms rotated independently by a mechanism which causes the arms to dwell at least twice during each revolution and subsequently causes the arms to accelerate in order to compensate for the time lost in the dwells.

The said mechanism has a stationary cam slot and a rotary driver having for each arm a stub shaft connected to the arm by a pivotal link and having a crank arm provided with a crank pin and roller which rides in a trailing manner in the cam slot, so that where the slot is concentric with the driver, the main arm is rotated at the same rate as the driver, but where the cam slot approaches the centre, the arm is rotated in reverse direction at a speed which nullifies the driving action of the driver, whilst, where the cam slot recedes from the centre, the rotation of the arm in the forward direction is accelerated to a higher speed than that of the driver.

The weft holders are preferably rotated by means of a stationary annular row of spur teeth.

The weft holders are preferably adapted to be swung by a mechanism from a retracted position in which they are rotated to coil on weft during their travel into a projected position in the path of the shuttle, so that transference of the coils can take place by the passage of bobbins and pushers on the shuttles through the holders.

A mechanism for swinging each weft holder from the retracted position into the projected position and vice versa, preferably has a tubular shaft journalled on the respective arm and carrying on it a releasably arrested disc which has the weft holder journalled on it eccentrically so as to be rotatable about its eccentric axis by spur gears mounted on the disc, so that it can be moved from an angular position where its centre is aligned with the centre of the tubular shaft into an angular position displaced 180° and back again by rotation of the weft holder by means of a spur gear provided on a shaft journalled in the tubular shaft and having a coupling arm whereby it can be coupled to the tubular shaft, which has an annular row of spur teeth in constant mesh with an annular row of spur teeth on the stationary member.

The said mechanism is preferably provided in conjunction with a locking pawl on the coupling arm and a locking pawl on the disc adapted to co-operate respectively with a locking notch in a circular flange on the tubular shaft and with a locking notch in a second circular flange on the said shaft, the pawls being controlled by tappet levers provided on the first named arm and acting on the pawls through tappet pins which, by engagement with the tappets, are capable of locking the coupling arm and disc against rotation, whereby the tubular shaft can be caused either to rotate the weft holder about its central axis for coiling weft on to itself, whilst the holder is locked against rotation eccentrically, or to rotate the weft holder eccentrically in order to project and retract the weft holder, or to lock the holder against both eccentric and concentric rotation.

A plurality of weft controlling devices is provided for holding the tail end of each piece of weft until some of the tail has entered the warp shed, severing the said end from the supply, and feeding the thus formed new starting end of the supply to an empty holder ready for the coiling of weft thereon, preparatory to the supply of the said weft to the shuttles of the loom.

Each of the devices may have a slide actuated by a cam and having mounted on it a feeder provided with a weft guide eye and a gripper, the gripper being adapted to grip the supply weft until some of the tail end of the piece is in the warp and the cutter has severed the piece from the supply weft and the new end has been fed to an empty holder, to then release the supply weft for coiling on the holder and then again grip the supply weft when the desired length of piece has been payed out from the feeder.

Devices may be provided for causing the wefts connected simultaneously to different holders to travel along different paths on their different ways from the feeders to the holders, in order to avoid tangling of the yarns during their passage from the feeders to the holders.

A cutter operated by a cam is provided to cut each supply of yarn after the requisite length has been payed out from the respective feeder.

In the more or less diagrammatic drawings—

Figures 2A, 2B and 2C are fragmentary side elevations of the left hand portion, the middle portion and the right hand portion respectively of parts of a mechanism for replenishing the shuttles of the said loom with weft yarn.

Figures 3A and 3B are fragmentary plan views showing respectively the left hand portion and the middle and right hand portion of the said mechanism with some portions of the mechanism omitted.

Figure 4 is an end view in section of the said mechanism, taken on line 4—4 of Figure 2C, but drawn to a larger scale than that figure.

Figure 5 is a detached side elevation illustrating a detail.

Figure 6 is a detached end elevation illustrating another detail.

Figure 7 is an end view in section similar to Figure 4 but drawn to a larger scale and showing portions of the mechanism detached and in a different position.

Figure 8 is a plan view of Figure 7 drawn to the same scale as Figure 7.

Figure 9 is a side view of Figure 7 drawn to the same scale as Figure 7.

Figure 10 is a detached side view in section taken on a line corresponding with line 10—10 of Figure 1.

Figure 1:
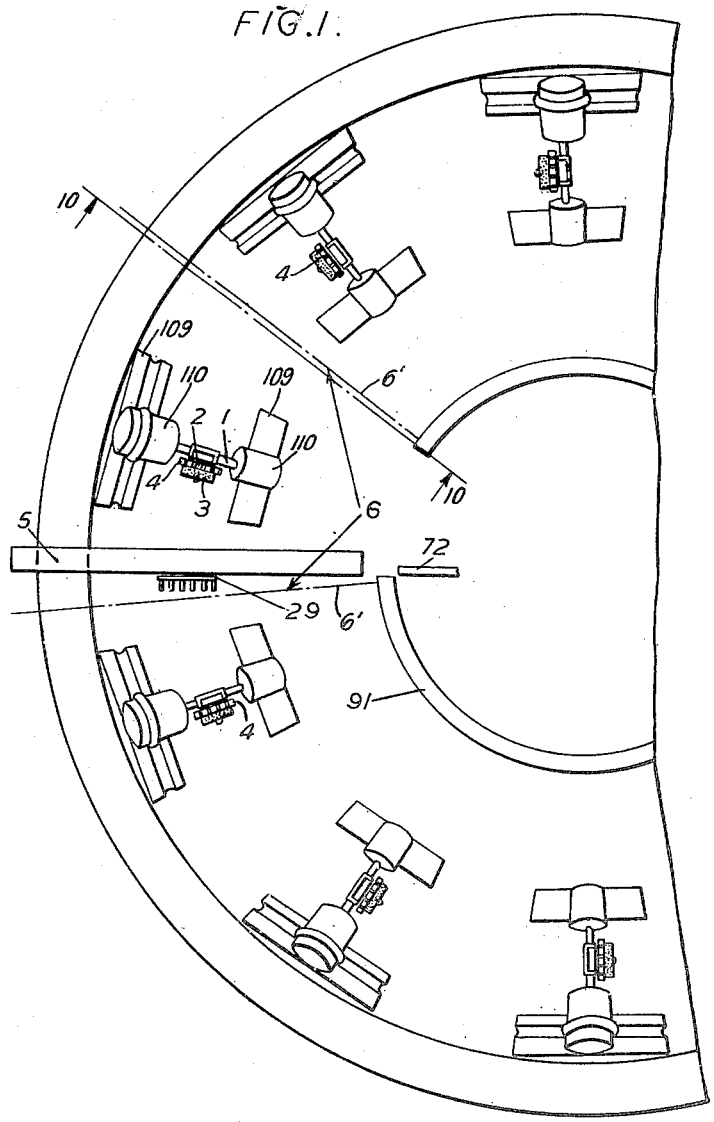
Figure 1 is a plan view of parts of a loom having shuttles which travel circularly in unidirection and indicates the disposition of a weft yarn replenishing mechanism relative to other parts of the loom.

Referring to the drawings, in the construction shown therein, each shuttle 1, Figures 1, 2B, 2C and 10, of a ten shuttle circular loom, for example having weft inserting means according to the patent specification of my Patent No. 2,506,442 issued May 2, 1950 and a radical warp 6' having a radial gap 6 for weaving a fabric whose fell is at 6'', Figure 10, for example as shown in the said patent specification, has a bracket 2 on which a bobbin 3 is mounted to rotate freely at right angles to the path of revolution of the shuttle 1. The cylindrical surface of the bobbin 3 is covered with a cut pile fabric, rabbit fur, bristles or small rubber pins. Spaced, radially projecting arms 4 are provided on the bracket 2 to project forwardly over the trailing part of the said surface and act as pushers.

A stationary casing 5, Figures 1, 2B, 2C, 4, a part only of which is indicated in Figure 1 for the sake of clearness, is mounted on the loom in the warp gap and has a main shaft 7 rotatably mounted in it and driven from the driving shaft of the loom by gearing of which a shaft 8 and meshing skew wheels 9 and 10 form a part. The main shaft 7 has a dished circular driving plate 11 mounted on it to rotate therewith. The shaft 7 also has the inner end bosses 12 of, for example, ten main arms 13 mounted on it so as to be free to rotate thereon, the bosses 12 being arranged side by side and the arms 13 being variously bent so that their outer ends all rotate in the same vertical plane. Each main arm 13 is connected to the driving plate 11 by a rock shaft 14 rotatably mounted on the plate 11, a connecting rock arm 15 provided on the rock shaft 14, and a link 16 connected by a pivot 17 to the rock arm 15 and by a pivot 18 to the main arm 13. The rock shafts 14 are distributed at uniform distances apart around the plate 11 and each rock shaft 14 has a trailing control arm 19 provided with a roller 20 which rides in a continuous cam slot 21 formed by a stationary cam plate 22 and a stationary cam ring 23 mounted on the casing.

The cam slot 21 is for the main portion concentric with the main shaft 7 but deviates inwards at four spaced places 24, 26, 27 and 28 respectively. The result of each deviation is to rock the rock shaft 14 at each place in a direction which causes the rock arm 15 and link 16 to stop rotation of the main arm 13. Each main arm 13 is thereby caused to dwell momentarily at four spaced stations during each revolution.

Weft yarn is prepared for transfer by holders each of which comprises a horseshoe-like member 29, Figures 1, 2B, 2C, 4, 7, 8 and 9, having a circular gap 30 in it through which the upper part of a shuttle bracket 2 and bobbin 3 can pass and a plurality of bent wires 31 arranged on it in a circular row spaced around the axis of the gap 30 so that the bracket projections 4 can pass them, each wire 31 projecting into the gap 30 and having a pair of straight, dropped ends 32 parallel with the axis of the gap 30 and pointing in the direction of motion of the shuttle 1.

Diametrically opposite the mouth of the gap 30 and outside the gap, the member 29 is connected to a spur gear 33 mounted rotatably on a holder disc 34 to rotate about an axis 35, Figures 7 and 9, eccentric to the disc axis 36. One holder disc 34 is provided for each main arm 13 and is rotatably mounted concentrically on a hollow shaft 37 carried in bearings 38 at the outer end of the main arm 13 and having an annular row of spur teeth 39 and two circular flanges 40 and 41 respectively. A transmission shaft 42 extends through the hollow shaft 37 and has at one end a spur gear 43 connected to the spur gear 33 by a carrier spur gear 44 rotatably mounted on the disc 34. The other end of the transmission shaft 42 has a control arm 45. A slidable pin 46 is mounted on the disc 34 and bears on a finger 47 provided on a spindle 48 rotatably mounted on the disc 34 and having a pawl 49 which engages a notch 50 in the periphery of the flange 41. The finger 47 has a lug 51 acted on by a tension spring anchored at 52 to the disc 34 and operating to hold the pawl 49 in engagement. A similar pin 53, finger 54, spindle 55, pawl 56 and spring 57 are provided on the control arm 45, the pawl 56 engaging a notch 58 in the flange 40.

All the annular rows of spur teeth 39 mesh constantly with an annular row of spur teeth 59, Figure 4, provided on a stationary, dished circular part 5 of the stationary casing 1. Therefore the hollow shafts 37 are all rotated continuously and positively by the rolling of the annular rows of spur teeth 39 along the stationary row of spur teeth 59 provided on a stationary ring and are therefore made to assume always the same angular positions at the same point in their path of revolution.

A channel lever 60, Figure 4, is pivotally mounted at 61 on each main arm 13 for engaging and depressing the pin 46 of the disc 34 and thereby locking the disc 34 to the main arm 13 and disconnecting the pawl 49 from the flange 41. The channel lever 60 is operated by a cam 62 provided on the rotary plate 11. A channel lever 64, Figure 4, is mounted on each main arm 13 for engaging and depressing the pin 53 on the control arm 45 and thereby locking the control arm 45 to the main arm 13 and disconnecting the pawl 56 from the flange 40. The channel lever 64 is operated by a cam 65 provided on a slide 25 which slides on the main arm 13 with a throw limited by a part 73, Figure 4, which connects the cam 65 to the slide 25 and engages a slot 74 in the rotary plate 11. In the angular position of the member 29 shown in Figures 7, 8 and 9, the centre around which the wires 31 are distributed is in alignment with the axis of the hollow shaft 37.

The channel levers 60 and 64 and their operating cams 62 and 65 perform the selective function of determining whether the levers 60 and 64, pins 46 and 53, and pawls 49 and 56 shall operate to effect rotation of the disc 34 by the hollow shaft 37 whilst the gears 43, 44 and 33 do not operate to change the angular position of the member 29 or to effect rotation of the gears 43, 44 and 33 by the hollow shaft 37 and therefore rotate the member 29 about its eccentric axis 35, or to prevent rotation of both the disc 34 and member 29 against rotation whilst disconnecting both of them from the hollow shaft 37 simultaneously.

Figure 2:
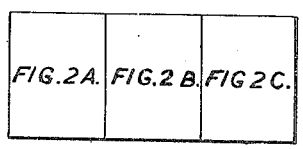
Figure 2 is a diagram showing how fragmentary Figures 2A, 2B and 2C piece together.

At the moment that each holder 29 picks up the end of a weft yarn supply at the first of the four stations, which is the yarn pick up station and is indicated in Figure 2C by an arrow A, the cams 62 and 65 control the channel levers 60 and 64 to keep the control arm 45 and disc 34 disconnected from the hollow shaft 37 and locked to the main arm 13 and therefore neither the member 29 nor the disc 34 is rotated by the hollow shaft 37 at the time that the holder dwells at the station A and during the passage of the holder therefrom to a point by the arrow marked B. The arrangement and mode of operation of the cams 62 and 65 will appear more fully hereinafter. At this point the holder 29 commences coiling. The said point can, by changing the cam slot 21, be changed to supply different lengths of weft yarn pieces to suit different widths of warps. The point B, Figure 2C, is reached after the holder has resumed its movement along the said path. As the arm 13 is accelerated due to the trailing lever 19 being turned outwards by the part 75a of the cam slot 21, the plate 11, because its speed is momentarily slower than that of the arm 13, acts with one end wall of the slot 74 therein on the part 73 and thereby prevents the part 73 and therefore the cam 65 from moving at the same speed as the arm 13 and causes the cam 65 consequently to be displaced relative to the arm 13 and the channel lever 64 and thereby rotate the channel lever 64. This rotation of the channel lever causes its channel to become disengaged from the pin 53 and thereby leave the pin 53 and therefore the shaft 42 free to rotate on the arm 13. Said rotation of the lever 64 also leaves the pin 53 and finger 54 free to be moved by the spring 57 until the pawl 56 engages the notch 58 in the flange 40 and thereby connects the arm 45 and shaft 42 to the flange 40 so that the wheel 43 is rotated. Simultaneously, the cam 62 allows the channel lever 60 to move to free the disc 34 from the main arm 13 and allow the pawl 49 to lock the disc 34 to the flange 41 so that the disc 34 is locked to the rotating hollow shaft 37 and therefore must rotate at the same speed as the wheel 43. The parts are then in the positions shown in Figures 7, 8 and 9 and the whole system therefore rotates about the axis 36. The gears 43, 44 and 33 therefore do not rotate the member 29 about its eccentric axis 35, but the member 29 is rotated about the axis 36 of the row of wires and the yarn is therefore coiled on the row of straight ends 32 of the wires 31 when the arm 13 travels away from the point B. This condition exists until the holder approaches the second station, which is the projecting initiating station and is indicated by the arrow marked C, Figure 2B. At the station C, whilst the arm 13 and therefore the channel lever 60 are momentarily stationary, the plate 11 and cam 62 on said plate continue to rotate and the consequent relative change in position between the cam 62 and lever 60 causes the cam 62 to rotate the lever 60 until its channel has engaged the pin 46 and thereby prevented rotation of the disc 34 relative to the arm 13 and said lever 60 has depressed the pin 46 and actuated the lever 48 against the action of the spring 52, Figure 7, and thereby rotated the ratchet 49 to disengage it from the notch 50 in the flange 41 and thereby ensured that the disc 34 shall not rotate when the hollow shaft 37 is again rotated by movement of the arm 13.

Thereupon, when the arm 13 resumes its motion, the gear wheel 43 is rotated by the connection of the arm 45 to the hollow shaft 37 and by rotating the gear wheels 44 and 33 causes the member 29 to rotate so that by the time it reaches the third station, which is the transfer station and is indicated by the arrow marked D, Figures 2B and 2C, it hangs in a still state vertically from the disc 34 with its gap lowermost, as shown in Figures 2B, 2C and 4. The shuttles are continuously travelling circularly and therefore passing repeatedly across the gap 6 in succession at uniformly spaced intervals. They are made to travel by any suitable means, for example by the means described in the patent specification of my Patent No. 2,506,442 issued May the 2nd, 1950, the combined supporting and driving rollers of the said means being shown diagrammatically in Figures 1 and 10 of the drawings belonging to this application and being designated 109 and the shuttle rollers which ride thereon being designated 110. Because each shuttle has a shuttle bobbin 3, each bobbin 3 is caused to travel with its shuttle and therefore pass across the gap 6. At the moment during which a shuttle bobbin 3 is thus being driven across the gap, the member 29 is in the path of said shuttle bobbin 3 and the said bobbin 3 therefore must go through the gap 30 in the member 29 in order to be taken past the member 29 by the normal motion of the shuttle 1. As the bobbin 3 is driven by the said normal motion through the member 29, the projections 4 on the bracket 2 impinge against those parts of the coils of weft yarn which extend between adjacent parts 32 of the wires 31, 32 and push the coils before the projections 4 and thereby slide the coils along the parts 32 until the coils have passed the ends of the parts 32 and have thus become free from the parts 32. The cylindrical surface of the bobbin 3 has already passed into the space surrounded by the coils of weft yarn, and, therefore, the coils when pushed off the straight ends of the wires 31, 32 are caught and carried on the bobbin 3 into the shed of the warp.

After the transference of the coils of weft yarn from the wires 31, 32 to the shuttle bobbin 3, the main arm 13 resumes its travel and the member 29, which is now empty, resumes its rotary movement until the member 29 is retracted with its axis 35 of rotation outermost. At this instant, it arrives at the forward station indicated by an arrow marked E, Figure 2C, where, during the dwell of the main arm 13, the cam 65 keeps the lever 60 engaged with and depressing the pin 46 and thereby keeps the disc 34 disconnected from the hollow shaft 37 and also keeps the disc 34 from rotating relative to the main arm 13, whilst the cam 62 causes the lever 64 to engage and depress the pin 53 and thereby disconnects the control arm 45 from the hollow shaft 37 and keeps the arm 45 from rotating relative to the main arm 13, and therefore the disc 34 and empty member 29 arrive again at the station A, namely the pick up station, in a non-rotating state. At each rotation of the main arm 13 the operations are repeated. During each rotation of the driving disc 11 there is therefore a plurality of holders coiling weft yarn on to themselves and, therefore, a charge of weft yarn can be provided by the holders each time a shuttle 1 travels across the warp gap 6 without any stoppages of the shuttles 1 and without running any of the parts and performing any of the necessary operations at speeds so high as to make them uncertain or erratic.

Because the hollow shafts 37 are positively rotated and continuously geared to the stationary row of spur teeth 59, and the discs 34 and holders 29 can be locked only in a single angular position, the holders are always in the correct position at the transfer station for effecting the transfer. The cam slot 21 also acts positively on the main arms 13 and, therefore, the stopping and acceleration of each main arm 13 at exactly the correct instants is to be expected.

The motion of the shuttles is positively synchronised with the motion of the holders because both are driven positively from the main shaft of the loom, and therefore correct co-operation of the holders and shuttles in effecting the transference of the coils of weft yarn is ensured. Exact control of the amount of rotation of the holders is also given by the mechanism, and, therefore, each piece of weft yarn inserted in the warp is of the exact length necessary to extend from a short distance outside the one edge of the warp only once through the warp to a short distance beyond the other edge of the warp.

To pick up the new end of weft yarn, each of the members 29 has a pivotal jaw 66, Figures 7, 8 and 9, mounted at 67 on it and pressed against a fixed jaw 68 by spring pressure. A pin 69 is provided on the member 29 to open the jaw 66. The pin 69 is operated by a cam 70, Figure 4, on a stationary part 71 to open the pivotal jaw 66 so that when the member is at the pick up station A the new end can be inserted between it and the fixed jaw 68. The pivotal jaw 66 is then released to grip the said end between it and the fixed jaw 68 before the member 29 leaves the pick up station A.

Figure 3:
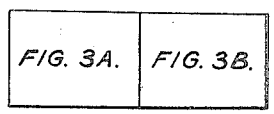
Figure 3 is a diagram showing how fragmentary Figures 3A and 3B piece together.
Figure 3A:
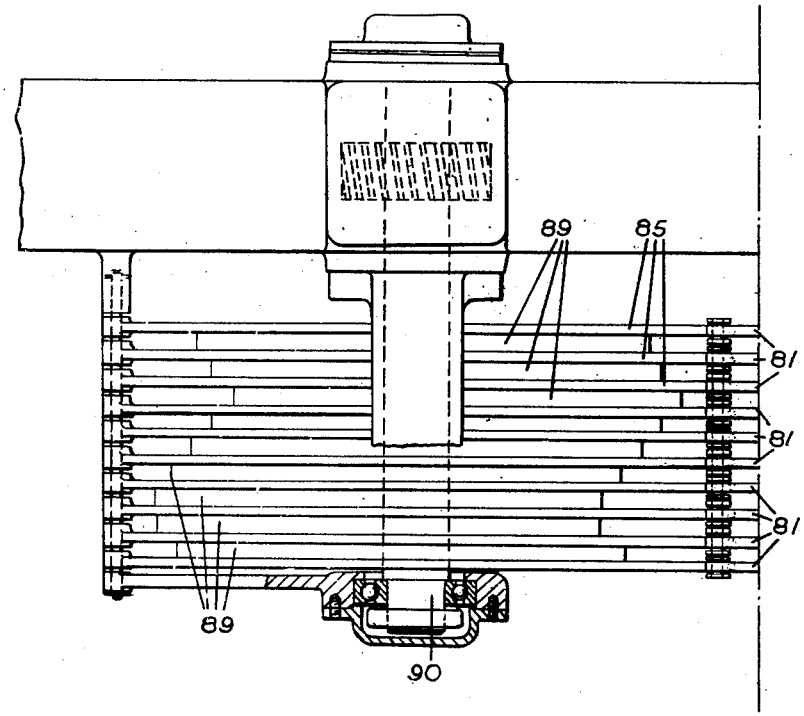

To supply weft yarn to be picked up by the holders, there is a plurality, for example ten, of feed strips 72, Figure 2C, arranged to converge radially on to the pick up station A. Each strip 72 hangs on and is connected at two points by pivotal links 75 to a foot 76 provided on a vertically movable rod 77, Figures 2C and 3B, guided by rollers 78, Figure 2C, provided on a stationary bracket 79 carried by a stationary post 80. The rods 77 are raised and lowered by levers 81 fulcrumed to a stationary part 82, Figures 2B and 2C, one end of each lever being connected by a pivotal link 83 to the rod 77 and the other by a pivotal link 84, Figure 2A, to a lever 85 which is pivoted at 86 to a stationary part 87 and has a roller 88 riding on a feed strip actuating cam 89 provided on a shaft 90 geared to the main shaft of the loom. The cams 89 operate to lower each feed strip 72 by its rods 77 from the pick up station A to a point near the entrance edge of the warp gap (see Figure 1) and below the fell ring 91, Figures 1 and 2C, as the member 29 fed by a strip 72 progresses from the pick up station A to the transfer station D. Therefore rod 77 is raised to return the feed strip 72 to the pick up station A ready in its turn to supply a member 29 with weft yarn. Each feed strip 72 receives a continuous supply of weft yarn from a different large bobbin or cheese (not shown) of weft thread, these supply bobbins or cheeses being mounted on a stationary creel (not shown). From each supply bobbin or cheese, the weft yarn passes through an eye 92 provided at the outer end of one of the feed strips 72, then through an eye 93, Figures 2C and 5, provided at the inner end of the feed strip 72, then between a pair of jaws 94, 95 provided at the said inner end, the jaw 94 being fixed and the jaw 95 movable and pulled by a tension spring (not shown) against the fixed jaw 94. Each feed strip 72 is retracted by a spring (not shown) so that during its ascent its inner end does not foul those of the descending strips 72. As each strip 72 reaches the height of the pick up station A, an advancing mechanism comprising a lever 96, Figure 2C, or cam, provided on the foot 76 and operated by a stop 97 which may be adapted to be moved into and out of operative position, operates to force the strip 72 inwards into and hold it against the action of the unshown spring in an advanced position where its eye 93 and jaws 94, 95 have pushed the yarn stretching from the one to the other into the space between the fixed jaw 68 and pivotal jaw 66 on the member 29, as shown in Figure 5. The lever 96 or cam is allowed to recede from that position as the strip 72 descends from the pick up position and is again advanced by a stop 98 near the end of its descent. A catch lever 99, Figures 2C and 5, is provided on the strip 72 to catch a pin 100 on the movable jaw 95 when it is opened and retain the jaw 95 open. An opening device consisting of a latch 101 pivotally mounted at 102 on the bracket 79 is provided to act on a shoulder of the movable jaw 95 as the strip 72 is retracted and thereby open the jaw 95 against its spring load. An incline 103 provided on the strip 72 trips the latch 101 as the retraction continues, and a stop 104 is provided to act on the catch lever 99 so as to trip the catch lever 99 and allow the spring load of the jaw 95 to close said jaw. The moment after the jaws 66, 68 on the member 29 have received the weft yarn presented to it by the eye 93 and jaws 94, 95 on the strip, the opening device opens the movable jaw 95 on the strip 72 and thereby leaves the yarn free to travel as the member 29 travels from the pick up station A to the transfer station D and coils yarn on to itself. At the end of the simultaneous descent of the strip 72, the stop 104, Figure 2C, trips the catch lever 99 and the supply yarn again becomes gripped between the jaws 94, 95 on the strip 72. It remains gripped until the transference of the coils from the member 29 to the shuttle 1 has occurred and some of the yarn near the jaws 94, 95 on the strip 72 has entered a stationary yarn guide 105 and the yarn extending from the shuttle bobbin to the jaws 94, 95 on the strip 72 has been laid and woven into the warp, whereupon the yarn is severed above the jaws 94, 95 so as to leave a new end extending between the eye 93 and the jaws 94, 95 on the strip 72. A pair of shear blades (not shown) mounted on a stationary part and operated by a cam are provided to sever the yarn. The advancing lever 96 or cam then again ceases to act on the strip 72 and the strip 72 is therefore retracted by spring action. The strip 72 which is now again gripping the yarn then ascends and is thereupon advanced by its advancing lever 96 or cam as hereinbefore described to bring its jaws 94, 95 back to the pick up station A where it feeds the new projecting end of the yarn supply to the next empty member 29 arriving at the pick up station A.

To prevent the portions of the weft yarns which extend simultaneously between the holders 29 and the strips 72 from entangling themselves with each other, there is provided a guide disc 106, Figures 2C and 4, rotated by the shaft 7 and having horns 107 which each consist of a piece of thin wire fixed at one end to the guide disc 106 and which are arranged round the periphery of the guide disc, and furthermore a stationary guide disc 108, Figure 4. Each of the said portions is caught by one of the horns and carried upwards in loop-like form, extending first outside the disc 106, then over the respective horn 107, and then behind the stationary disc 108 to the holder 29, so that it is out of the way of the next lower yarn portion, until the changing angular position of the horn becomes such that the yarn can slide out of it, whereupon the said portion becomes disengaged and the slack of the loop is wound up on the holder 29.

If different colours or kinds of weft yarn are to be woven into the warp, each slide has a series of feed strips separately hung on it side by side and controlled by a separate advancing mechanism and drawing its yarn from a supply of weft yarn of a different colour or kind.

I claim:

1. In weaving wherein shuttles travel circularly in always the same direction through a radial warp having a radial gap, the process of coiling weft into coils before transferring it to the shuttles and subsequently transferring the precoiled coils to the shuttles whilst the shuttles are travelling across the radial gap, the transferred weft being uncoiled in the warp as the shuttles travel through the warp.

2. The application of weft to a warp in weaving with the aid of shuttles which travel circularly in a unidirection through a radial warp having a radial gap, consisting in coiling weft in coils on bare weft holders before transferring the weft to the shuttles and in subsequently conveying the weft holders and holding the said weft holders temporarily stationary in the path of the shuttles for the transfer of the precoiled coils from the said holders to the shuttles without uncoiling and without the transference of any weft holder, there being a plurality of holders carrying coiled weft ready for transference of the coiled weft to the shuttles, and the coiling of fresh coils of weft on the holders occurring whilst the loom is in operation.

3. The application of weft to a warp with the aid of a travelling shuttle, comprising the precoiling of weft into coils on a bare holder prior to the transfer of the said weft to the shuttle, and causing the transference of the preformed coils from the holder to the travelling shuttle whilst the holder is stationary.

4. An apparatus for applying wefts to a warp in a circular loom for weaving non-tubular fabric, comprising weft inserting shuttles, rotatably mounted main arms on the apparatus, rotatable carriers mounted on the main arms, and rotatable weft holders mounted eccentrically on said carriers.

5. An apparatus for applying wefts to a warp in a circular loom for weaving non-tubular fabrics, comprising shuttles, rotatable members on the apparatus, a tubular shaft journalled on each rotatable member, a releasably arrested disc carried on the tubular shaft, a weft holder journalled eccentrically on the disc and rotatable about its eccentric axis, spur gears on the disc and weft holder, an inner shaft journalled in the tubular shaft, a spur gear on said inner shaft and meshing with one of the first named spur gears, a coupling arm provided on the inner shaft, an annular row of spur teeth on the tubular shaft, an annular row of spur teeth in constant mesh with the spur teeth on the tubular shaft, and a stationary member on which the second named annular row of spur teeth is provided.

6. An apparatus for applying wefts to a warp in a circular loom for weaving non-tubular fabrics, comprising shuttles, rotatable members separate from the shuttles, a tubular shaft journalled on each rotatable member, a releasably arrested disc carried on the tubular shaft, a weft holder journalled eccentrically on the disc and rotatable about its eccentric axis, spur gears on the disc and weft holder, an inner shaft journalled in the tubular shaft, a spur gear provided on the inner shaft and connected to one of said spur gears, a coupling arm provided on the inner shaft, an annular row of spur teeth on the tubular shaft, a stationary annular row of spur teeth in uninterrupted mesh with the spur teeth on the tubular shaft, two circular flanges provided on the tubular shaft and each having a notch, a pawl on the coupling arm and a pawl on the disc for engagement with the notches, channel levers on the rotatable members, and pins on the coupling arm acted on by the channel levers.

7. An apparatus for applying wefts to a warp in a circular loom for weaving non-tubular fabrics, comprising a plurality of shuttles, a plurality of weft coil holders separate from the shuttles, means for rotating the holders concentrically, weft grippers on the holders, a plurality of weft end presenting implements, weft grippers on the said implements, slides carrying the implements, cams operating the slides, guides guiding the slides vertically, and operating means opening the weft grippers on the said implements.

8. An apparatus for applying wefts to a warp in a circular loom for weaving non-tubular fabric, comprising inserting members for inserting wefts into the warp, revolvable and rotatable weft winders on the apparatus, for prewinding wefts into coils thereon and offering the prewound coils to the inserting members for transfer to the inserting members, and feeding members for feeding the wefts to the weft winders for prewinding into coils on the winders.

9. An apparatus for applying wefts to a warp, comprising inserting members for inserting wefts into the warp, revolvable and rotatable weft winders separate from the inserting members, for prewinding wefts into coils on themselves and offering the prewound coils to the inserting members for transfer to the inserting members, and feeding members for presenting wefts in continuous lengths to the weft winders.

10. An apparatus for applying wefts to a warp in a circular loom for weaving non-tubular fabric, comprising shuttles, means for driving the shuttles along a circular course, weft holders separate from and operative independently of the shuttles, means for rotating each weft holder about its own axis, means for feeding weft to each weft holder, means for conveying each weft holder along another circular course, and means for arresting the motion of each weft holder independently of the said means for driving the shuttles.

11. An apparatus for applying wefts to a warp in a circular loom for weaving non-tubular fabric, comprising shuttles, shuttle conveying means, arms, weft holders carried by the arms, arm rotating means, and dwell producing devices which cause dwells and subsequent acceleration of each arm during each of its revolutions.

12. An apparatus for applying wefts to a warp in a circular loom for weaving non-tubular fabric, comprising shuttles, shuttle driving means, rotatably mounted main arms on the apparatus, main arm rotating means, weft coil holders mounted on the main arms and separate from the shuttles, means for rotating the holders concentrically, the main arm rotating means comprising a continuous cam slot on the apparatus, a rotary driving plate on the apparatus, rock shafts on the driving plate, rock arms on the rock shafts, pivotal links connecting the rock arms to the main arms, trailing control arms provided on the rock shafts, and rollers mounted on the trailing arms and riding in the continuous cam slot.

13. An apparatus for applying wefts to a warp in a circular loom for weaving non-tubular fabric, comprising shuttles, shuttle driving means, rotary main arms on the apparatus, rotatable weft coilers and coil holders on the main arms, spur toothed gear wheels provided on the main arms and connected to the weft coilers for rotating the coilers, and a stationary circular row of spur teeth in constant mesh with the spur toothed gear wheels.

References Cited in the file of this patent

UNITED STATES PATENTS

| Number | Name | Date |
|---|---|---|
| 2,042,703 | Dreyfus et al. | June 2, 1936 |
| 2,042,704 | Dreyfus et al. | June 2, 1936 |

FOREIGN PATENTS

| Number | Country | Date |
|---|---|---|
| 344,427 | Great Britain | Mar. 4, 1931 |